United States Patent
Hamilton et al.

[11] Patent Number: 6,073,963
[45] Date of Patent: Jun. 13, 2000

[54] INITIATOR WITH INJECTION MOLDED INSERT MEMBER

[75] Inventors: Brian K. Hamilton, Littleton; Brent A. Parks, Englewood, both of Colo.; Dario G. Brisighella, Mendon, Utah

[73] Assignee: Oea, Inc., Aurora, Colo.

[21] Appl. No.: 09/044,523

[22] Filed: Mar. 19, 1998

[51] Int. Cl.[7] .............................. B60R 21/26; F42B 3/10
[52] U.S. Cl. ................ 280/741; 102/202.9; 102/202.14; 102/531
[58] Field of Search .................... 280/736, 737, 280/741, 742; 102/530, 531, 202.5, 202.9, 202.12, 202.14

[56] References Cited

U.S. PATENT DOCUMENTS

| | | | |
|---|---|---|---|
| 3,672,301 | 6/1972 | Abbott | 102/43 C |
| 3,895,098 | 7/1975 | Pietz | 423/351 |
| 3,990,367 | 11/1976 | Smith | 102/70 R |
| 4,110,813 | 8/1978 | Hoheisel et al. | 361/248 |
| 4,170,939 | 10/1979 | Hoheisel et al. | 102/28 S |
| 4,278,638 | 7/1981 | Nilsson et al. | 422/166 |
| 4,358,135 | 11/1982 | Tsuge et al. | 280/806 |
| 4,420,216 | 12/1983 | Motoyama et al. | 339/183 |
| 4,530,516 | 7/1985 | Adams et al. | 280/741 |
| 4,561,675 | 12/1985 | Adams et al. | 280/734 |
| 4,578,247 | 3/1986 | Bolieau | 422/165 |
| 4,600,123 | 7/1986 | Galbraith | 222/3 |
| 4,628,818 | 12/1986 | Nilsson | 102/202.2 |
| 4,690,063 | 9/1987 | Granier et al. | 102/530 |
| 4,722,551 | 2/1988 | Adams | 280/736 |
| 4,734,265 | 3/1988 | Nilsson et al. | 422/165 |
| 4,806,180 | 2/1989 | Goetz et al. | 149/5 |
| 4,858,956 | 8/1989 | Taxon | 251/129.07 |
| 4,902,036 | 2/1990 | Zander et al. | 280/736 |
| 4,923,212 | 5/1990 | Cuevas | 280/736 |
| 4,944,528 | 7/1990 | Nilsson et al. | 280/741 |
| 4,988,307 | 1/1991 | Muzslay | 439/188 |
| 5,000,695 | 3/1991 | Nishiyama et al. | 439/276 |
| 5,054,395 | 10/1991 | Vetter et al. | 102/202.3 |
| 5,056,815 | 10/1991 | Geisreiter | 280/736 |
| 5,062,367 | 11/1991 | Hayashi et al. | 102/530 |
| 5,064,973 | 11/1991 | Zinn et al. | 200/51.1 |
| 5,100,174 | 3/1992 | Jasken et al. | 280/741 |
| 5,131,679 | 7/1992 | Novak et al. | 280/736 |
| 5,142,982 | 9/1992 | Diepold et al. | 102/202.5 |
| 5,178,547 | 1/1993 | Bonas et al. | 102/531 |
| 5,221,109 | 6/1993 | Marchant | 280/736 |
| 5,269,560 | 12/1993 | O'Loughlin et al. | 280/736 |
| 5,334,025 | 8/1994 | Fohl | 439/188 |
| 5,558,366 | 9/1996 | Fogle, Jr. et al. | 280/736 |
| 5,576,509 | 11/1996 | Refouvelet et al. | 102/202.7 |
| 5,596,163 | 1/1997 | Caflisch et al. | 102/530 |
| 5,634,660 | 6/1997 | Fink et al. | 280/741 |
| 5,711,531 | 1/1998 | Avory et al. | 277/12 |
| 5,788,275 | 8/1998 | Butt et al. | 280/737 |

*Primary Examiner*—Peter C. English
*Attorney, Agent, or Firm*—Sheridan Ross P.C.

[57] ABSTRACT

An initiator assembly for use with an inflator in a vehicle is provided. The initiator assembly includes an integral, one-piece insert member that is injection molded with insulating material to an initiator. The insert member suitably engages an initiator adapter for properly holding the initiator assembly in place relative to the inflator housing both before and after the initiator assembly is ignited. The insert member can include a number of different embodiments, each of which is characterized by the relatively short length of the shoulder that engages the initiator adapter.

9 Claims, 5 Drawing Sheets

INITIATOR WITH INJECTION MOLDED INSERT MEMBER

FIELD OF THE INVENTION

The present invention relates to inflators for filling an air bag or inflatable in a vehicle and, in particular, an inflator initiator assembly for igniting propellant in the inflator.

BACKGROUND OF THE INVENTION

Inflators for inflating an air bag or other inflatable in a vehicle typically include an initiator assembly for igniting the propellant that is contained within the inflator housing. Upon activation of the propellant, it generates gases for filling the inflatable. The initiator assembly commonly includes an exterior configuration or member for connecting to a supporting structure. The assignee of the present application has previously developed an initiator assembly with an outer metal casing that has a boss or collar for coupling to the inflator housing. The collar is located at the outer surface of insulating material that surrounds initiator conductive pins. In an initiator assembly design of another, it is known to injection mold portions of a cover with plastic material that surrounds portions of the initiator.

Nonetheless, it is desirable to provide an initiator assembly that facilitates a suitable connection between the initiator assembly and the inflator housing, while reducing the size of the injection molded part. Such a configuration should also not create an additional burden in the manufacturing of the initiator assembly, while not increasing the cost associated with the assembly.

SUMMARY OF THE INVENTION

In accordance with the present invention, an initiator assembly of an inflator is provided. The initiator assembly, when activated by an ignition signal received by an initiator conductive pin, results in ignition of propellant contained in an inflator housing. The initiator assembly includes an initiator and a collar assembly joined to the initiator. In addition to the at least one conductive pin, the initiator has a cap member that surrounds a charge that ignites when the ignition signal is received. The collar assembly holds the initiator assembly to the inflator housing including after activation of the initiator.

The collar assembly includes an injected molded insulating material and an insert member that is fixedly joined to the insulating material during the injection molding process. The insulating material is useful in insulating the one conductive pin from a second conductive pin or, in another embodiment, from another conductive component which is at a different electrical potential from the one conductive pin when it receives the ignition signal. The insert member is a single, integral piece that can be defined as including a body member and a shoulder. The body member has an interior section that is disposed inwardly of the insulating material. The shoulder juts outwardly a sufficient distance from the insulating material for contact with engagement portions of the inflator housing. The inter-engagement or mating between the shoulder and such portions of the inflator housing controls positioning of the initiator assembly relative to the inflator housing before and after activation of the initiator assembly. This outward location of the shoulder constitutes an outward length or dimension. The interior section that extends inwardly defines an inward length or dimension thereof. In connection with providing the desired interconnection between the insert member and the insulating material, together with the inter-engagement between the shoulder and the inflator housing, this outer length of the shoulder is less than the inward length of the interior section.

The insert member can be configured according to a number of different embodiments. In a first embodiment, the interior section and the shoulder are joined together by an intermediate section integral with the interior section and the shoulder. The intermediate section has a height that is greater than the height of the interior section, with the height being defined in the same direction as the length of the one or more conductive pins. In a second embodiment, the insert member has a collar in the form of a loop having two integral loop portions. This insert member also has an exterior foot that integrally extends from one of the loop portions in a direction along the length of two conductive pins. In a third embodiment, the body member of the insert member has a center section with the shoulder extending from the center section away from the insulating material. Instead of one interior section, two interior sections can be defined that extend from essentially opposite ends of the center section in opposing directions. That is, a first interior section extends away from the center section in a direction along the length of one conductive pin and the second interior section extends in the opposite direction.

Based on the foregoing summary, regardless of the particular configuration or embodiment, an initiator assembly is provided that can be readily connected to an inflator housing. The proper inter-engagement between the inflator housing and the initiator assembly is achieved in a manner like that previously utilized where the insert member is not injection molded with the insulating material. In the present invention, the injection molding of the insert member to the insulating material facilitates the assembly process for the initiator assembly. Additionally, the design or structure of the insert member results in a lower cost and less metal being required than the previous design where the insert member was not injection molded. At least one of the embodiments of the insert member is part of an initiator assembly that has a single conductive pin. However, other embodiments can be employed that have more than one such conductive pin.

Additional advantages of the present invention will become readily apparent from the following discussion, particularly when taken together with the accompanying drawings.

DETAILED DESCRIPTION

Figure 1:
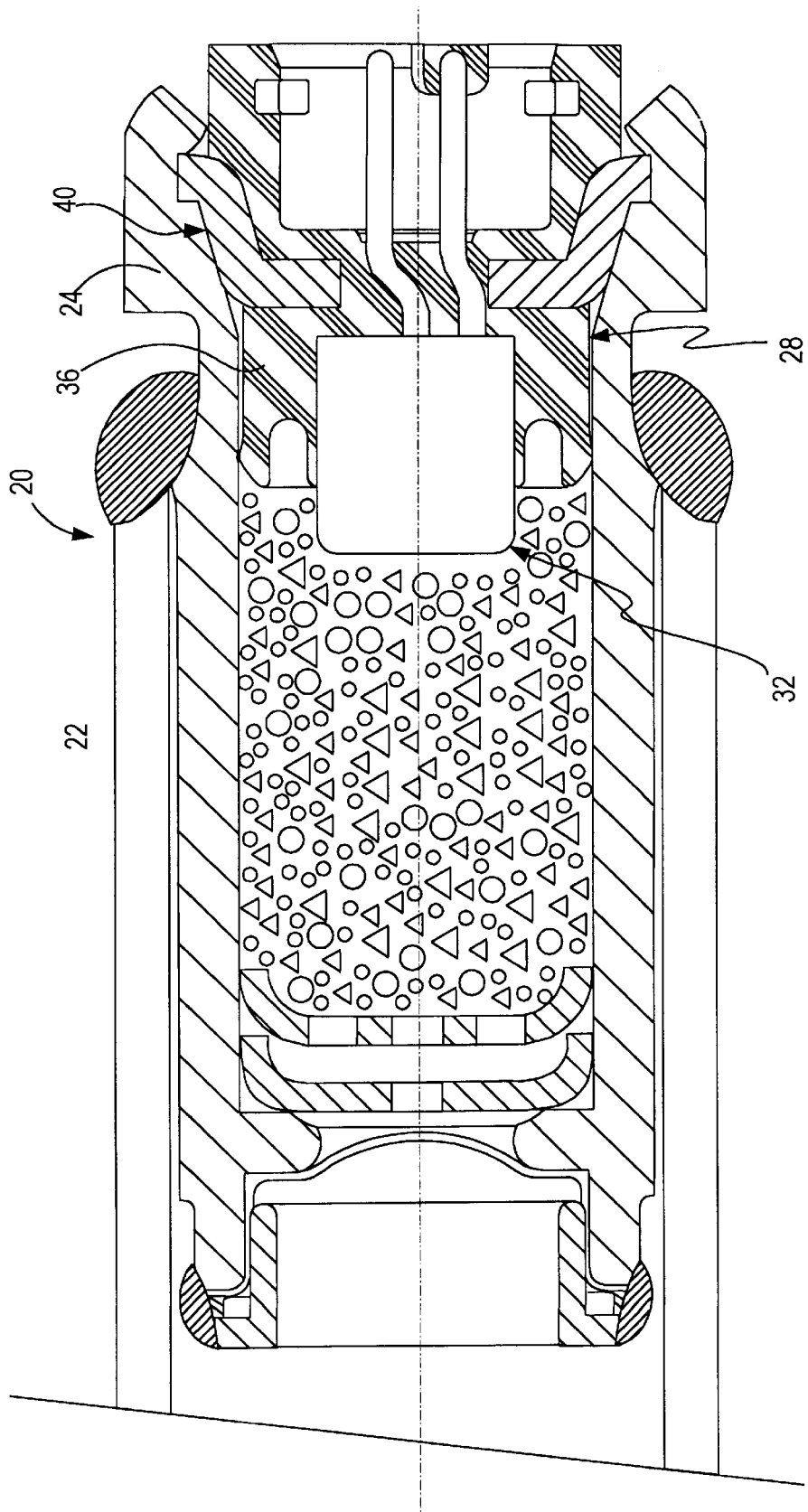
FIG. 1 is a fragmentary, longitudinal, cross-sectional view of an initiator assembly of a first embodiment joined to an inflator housing.
Figure 2:
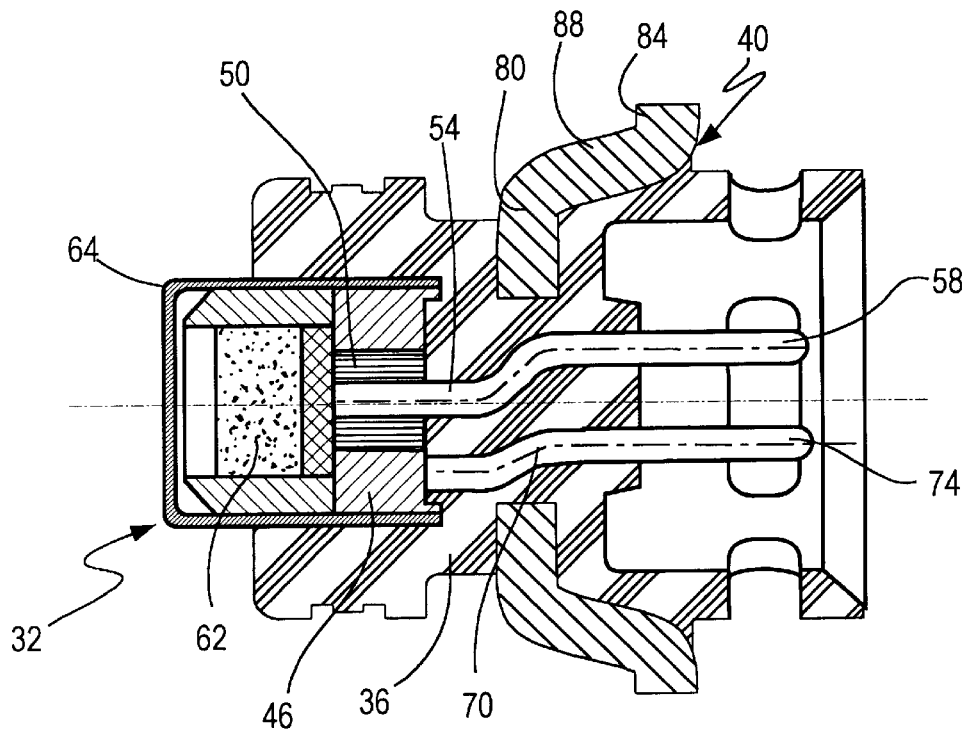
FIG. 2 is a cross-sectional view of the initiator assembly of the first embodiment.
Figure 3:
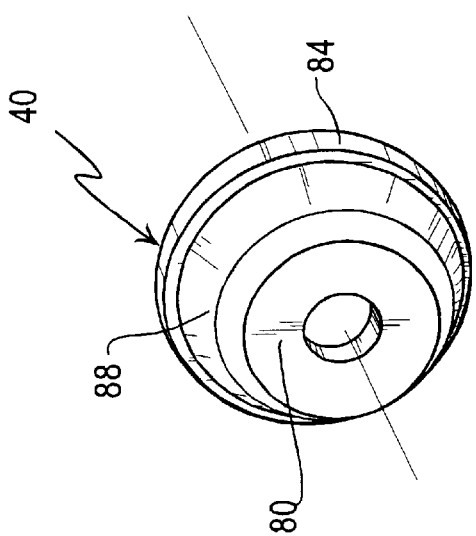
FIG. 3 is a perspective view of the insert member of the first embodiment.

With reference to FIGS. 1–3, a first embodiment of an initiator assembly of an inflator for inflating an air bag or inflatable in a vehicle is illustrated. The inflator 20 includes an inflator housing 22 and an initiator adapter 24. The initiator assembly 28 is joined at one end of the initiator adapter 24. The initiator assembly 28 includes an initiator 32 having portions surrounded by an insulating material 36. An insert member 40 is joined to the insulating material. With respect to combining the insulating material 36 and the insert member 40 with the initiator 32, an injection molding process is utilized in which liquid or flowable insulating material 36 is disposed about such portions of the initiator 32 and portions of the insert member 40. When the insulating material 36 solidifies, the insert member 40 is fixedly held to the insulating material 36 and the insulating material 36 is fixedly held to the initiator 32.

With particular reference to FIG. 2, the initiator 32 includes a metal eyelet 46 having a bore 50 formed therein. A first conductive pin 54 having a tip 58 has upper portions positioned through the bore 50, and held in place by a glass to metal seal, for carrying an ignition signal to ignite a charge 62. A cap member 64 surrounds or covers the charge 62 and is welded to the eyelet 46. The initiator 32 also includes a second conductive pin 70 having a tip 74. The second conductive pin 70 is insulated from the first conductive pin 54. The insulating material 36 provides electrical insulation between the first and second conductive pins 54, 70.

The insulating material 36 can include a variety of compositions including plastic-like compositions that are well-suited for electrical insulation and injection molding. As further seen in FIG. 2, the insulating material has a section that defines a mating interface 76. The mating interface has an inner, cavity-forming inner wall 78. Inwardly of and bounded by the inner wall 78 is a cavity 82. Portions of the first and second conductive pins 54,70 extend into the cavity 82 and are spaced from each other as well as from the inner wall 78. The mating interface 76 terminates adjacent to the tips 58, 74 of the first and second conductive pins 54, 70, respectively. As also seen in FIG. 2, the inner wall 78 has a number of discontinuities or interruptions 86 adjacent the end of the mating interface 76. As illustrated in the figures that are later discussed, comparable structural features are provided in other embodiments. The insert member 40, as seen in FIG. 3, is an integral one-piece unit that can be defined as including an interior section 80 that begins at the outer edge of the insulating material and has an inward length or dimension that extends inwardly of the insulating material 36. In the embodiment illustrated, the interior section 80 has a free or terminating end that is surrounded by insulating material 36. The opposite end portions of the insert member 40 form a shoulder 84 that juts outwardly and away from the insulating material 36. The shoulder 84 has a length or dimension that extends in this outward direction. The insert member 40 is also defined to include an intermediate section 88 that is disposed between the interior section 80 and the shoulder 84. The intermediate section 88 is integral with the interior section 80 and the shoulder 84. The interior section 80 can be defined as including a length in a direction substantially perpendicular to substantial portions of the conductive pins 54, 70. The length of the shoulder 84 extending outwardly from the insulating material 36 is less than this length of the interior section 80. Preferably, the outward length of the shoulder is less than 2 times the inward length of the interior section. The interior section can also be defined as having a height in a direction parallel to the substantial portions of the conductive pins 54, 70. The intermediate section 88 also has an exterior height extending in the same direction. This exterior height is located outwardly of the insulating material 36 and is greater than the height of the interior section.

Figure 4:
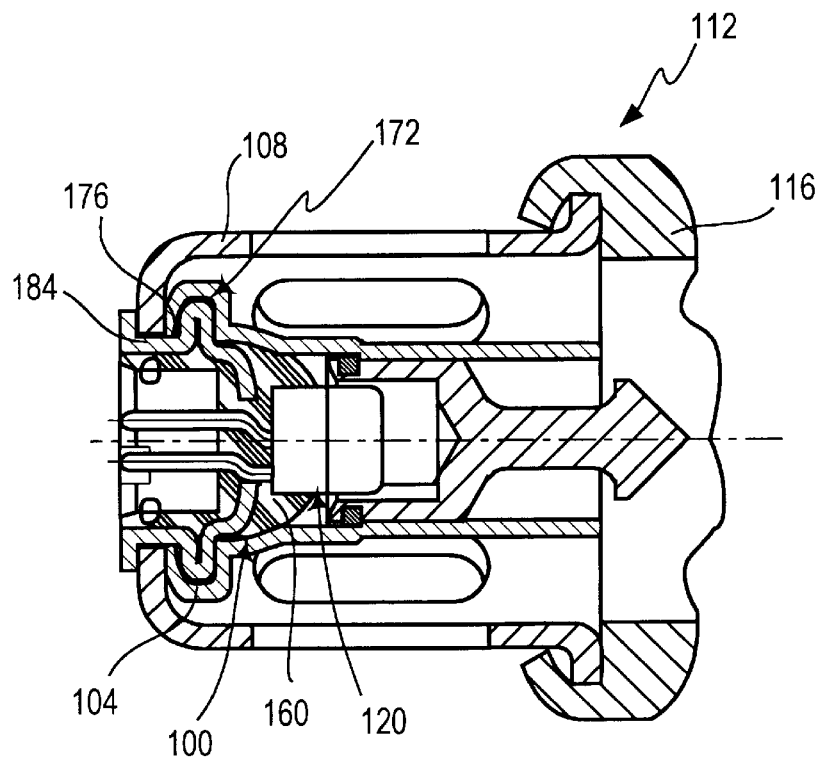
FIG. 4 is a fragmentary, longitudinal, cross-sectional view of an initiator assembly of a second embodiment joined to an inflator housing.
Figure 6:
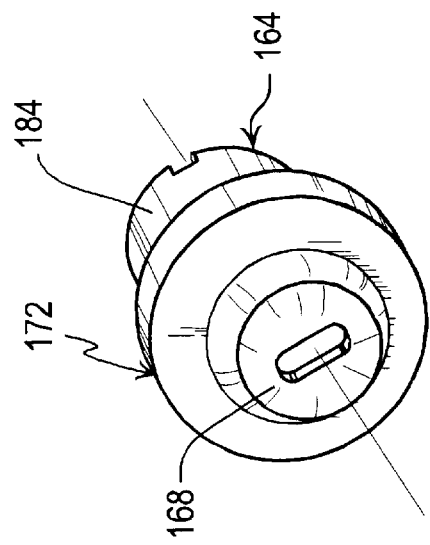
FIG. 6 is a perspective view of the insert member of the second embodiment.
Figure 9:
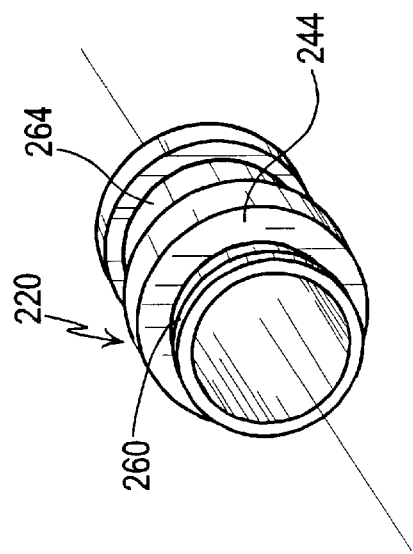
Figure 5:
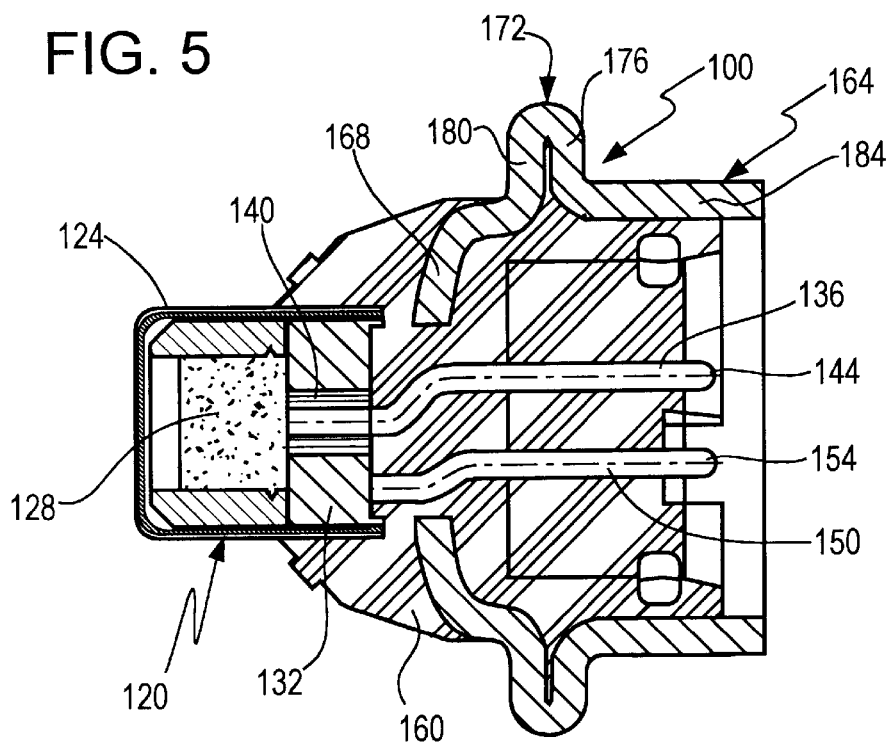
FIG. 5 is a cross-sectional view of the initiator assembly of the second embodiment.

With reference to FIGS. 4–6, a second embodiment of an initiator assembly, particularly an insert member, is next discussed. The initiator assembly 100 engages an initiator adapter 104. The initiator adapter 104 contacts portions of a diffuser assembly 108 of an inflator 112. The inflator 112 includes an inflator housing 116 that is joined at one of its ends to the diffuser assembly 108.

The initiator assembly 100 includes an initiator 120 that includes a cap member 124, which encloses a charge composition 128 and an eyelet 132. A first conductive pin 136 has an upper portion that is held by a glass to metal seal within a bore 140 formed in the eyelet. The first conductive pin 136 has a tip 144 that is electrically connectable for receiving an ignition signal when the inflator is activated. A second conductive pin 150 having a tip 154 is spaced from the first conductive pin 136. Insulating material 160 electrically insulates the two pins 136, 150 from each other, as well as surrounding portions of the cap member 124.

Like the first embodiment, the initiator assembly 100 also includes an insert member 164. This insert member 164 has a different configuration or design than the insert member 40 of the first embodiment. In that regard, the insert member 164 includes an interior section 168 that extends from an outer edge of the insulating material 160 inwardly of such insulating material 160. As can be seen in FIG. 5, instead of being completely straight, the length or inward dimension of the interior section 168 is provided at somewhat of an angle, different from 90° relative to substantial portions of the length of the conductive pins 136, 150 including their tips 144, 154, respectively. The interior section 168 can be defined as terminating in a loop section 172 that acts as a shoulder for inter-engagement with the initiator adapter 104, as seen in FIG. 4. The loop section 172 has first and second loop portions 176, 180, with a slight gap therebetween that can receive portions of the insulating material 160. The loop section 172 is intermediate the interior section 168 and an exterior foot 184 that is disposed outwardly of the insulating material 160 and has a length that extends substantially parallel to the conductive pins 136, 150 towards and beyond the tips 144, 154 thereof, respectively. Like the first embodiment, the outward dimension or length of the loop section 172 that constitutes the shoulder is less than twice the inward dimension or length of the interior section 168 that extends inwardly of the insulating material beginning at the outer edge of the insulating material to the terminating end of the interior section 168. Preferably, this outward dimension or length of the loop section 172 is less than the length of the interior section 168.

Similar to the first embodiment, the insert member 164 is readily attached as part of the initiator assembly 100 during an injection molding process in which the insulating material 160 is in a flowable state. After hardening, the insert member 164 is fixedly held to remaining parts of the initiator assembly 100, particularly by means of the interconnection between the insulating material 160 and the interior section 168 of the insert member 164.

Figure 7:
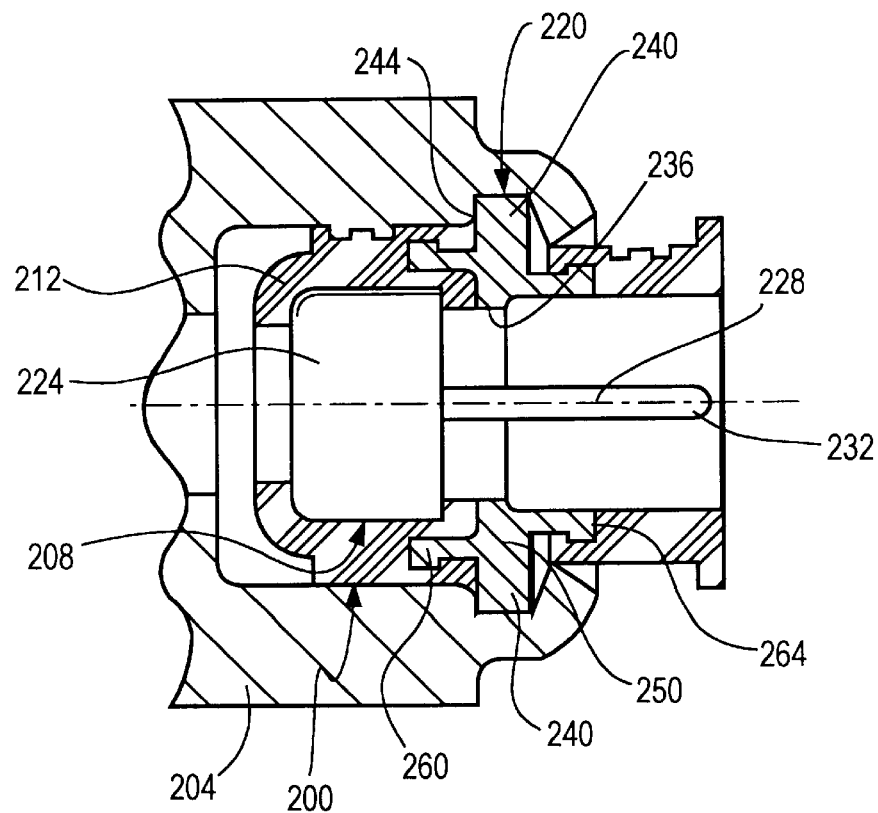
FIG. 7 is a fragmentary, longitudinal, cross-sectional view of an initiator assembly of a third embodiment joined to an inflator housing.
Figure 8:
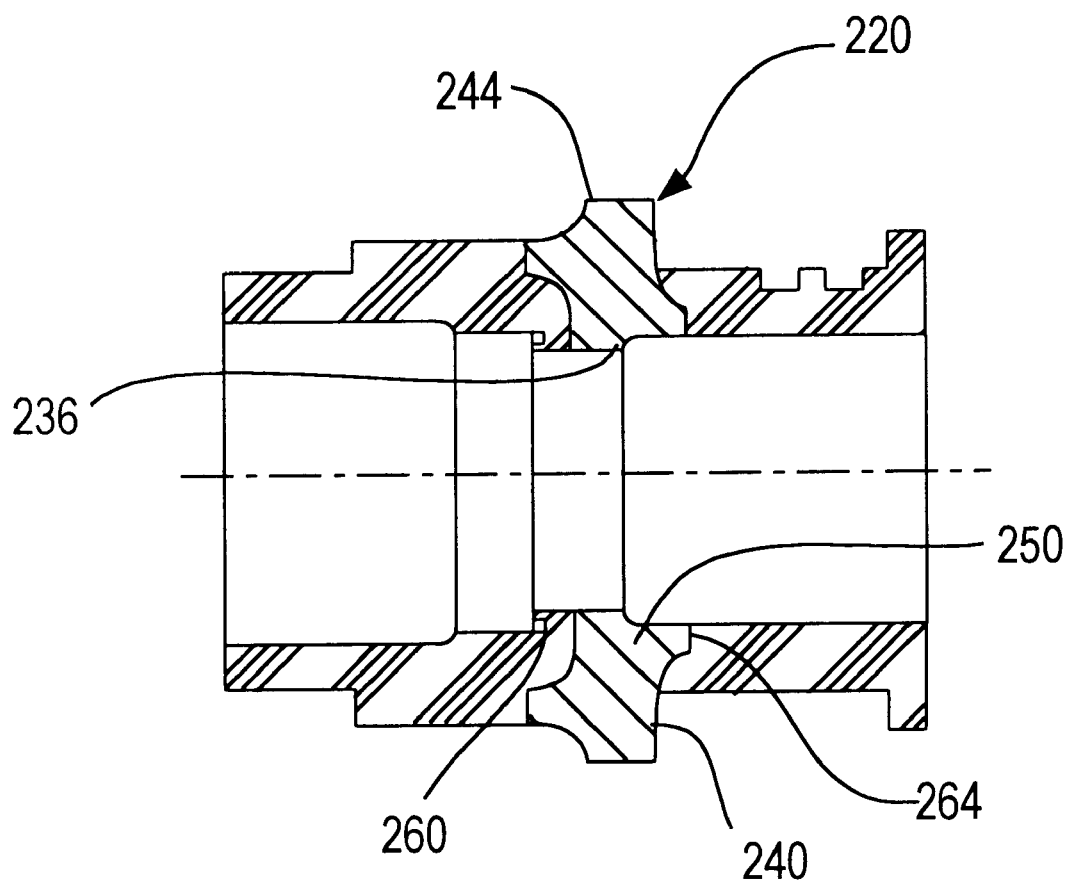
FIG. 8 is a perspective view of the insert member of the third embodiment.

With reference to FIGS. 7–8, a third embodiment of an initiator assembly is illustrated and next described. An initiator assembly 200 is held within an initiator adapter 204 that can be connected to an inflator housing of an inflator for use in a vehicle. Like the previous two embodiments, the initiator assembly 200 includes an initiator 208, insulating material 212 and an insert member 220. The insert member 220 is an integral, one-piece member that is fixedly held adjacent to the initiator 208 by means of the insulating material 212.

In this embodiment, the initiator 208 includes a cap member 224 and a single conductive pin 228 having a tip or free end 232. The tip 232 terminates near, but before, the end of the insulating material 212. In this embodiment, the insulating material 212 surrounds substantial portions of the cap member 224 including parts of the top thereof. The insulating material 212 is provided about the cap member 224, as well as joining the insert member 220 to the initiator 208, during an injection molding process.

The insert member 220 has a bore or a through hole 236, which is able to receive or pass the conductive pin 228. The insert member 220 can be defined as including a shoulder 240 with a ledge 244 that extends from the outer edge of the insulating material outward and away therefrom a desired distance. The insert member 220 can be further defined as including a center interior section 250 that is integral with the shoulder 240, and which is defined as beginning from the outer edge of the insulating material 212 on the side of the shoulder 240 opposite the ledge 244 and extends inwardly of the insulating material 212 to the bore 236. Like the previous two embodiments, the shoulder 240 has an outer dimension or length that extends away from the insulating material 212. The length of the shoulder 240 is less than two times the inward dimension or length of the center section that extends inwardly of the insulating material 212. The length of the shoulder 240 can even be less than the length of the center interior section 250. Unlike the previous two embodiments, the insert member 220, particularly the center interior section 250, extends completely through the insulating material 212 and terminates essentially at the bore 236 with the insulating material 212.

The insert member 220 also has a first interior section 260 that extends from the center interior section 250 in a direction towards and past an end of the cap member 224. The first interior section 260 is surrounded by the insulating material 212. A second interior section 264 is offset from the first interior section 260 and is located relatively more inwardly in the insulating material 212. The second interior section extends in an opposite direction from the first interior section 260, i.e., towards the tip 232 of the single conductive pin 228. The inner area of the second interior section 264 terminates at the bore 236. A total height can be defined between the top ends of the first and second interior sections 260, 264. This total height is greater than the height of the shoulder 240 and this total height is greater than the outward dimension or length of the shoulder 240.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or uses of the invention. It is intended that the appended claims be construed to include alternative embodiments to the extent permitted by the prior art.

What is claimed is:

1. An initiator assembly for use in a vehicle, comprising:
    an initiator including at least one conductive pin having a length; and
    a collar assembly joined to said initiator and including:
        an injection-molded insulating material surrounding at least portions of said initiator, said insulating material extending in a direction of said length of said at least one conductive pin and defining a mating interface that contains at least portions of said at least one conductive pin; and
        an insert member joined by injection molding to said insulating material and including a body member and a shoulder integral therewith, said body member having an interior section with an inward length extending inwardly within said insulating material and said shoulder having an outward length extending outwardly from said insulating material;
    wherein said outward length of said shoulder is less than twice said inward length of said interior section.

2. An initiator assembly, as claimed in claim 1, wherein:
    said outward length of said shoulder is less than said inward length of said interior section.

3. An initiator assembly for use in a vehicle, comprising:
    an initiator including at least one conductive pin having a length; and
    a collar assembly joined to said initiator said collar assembly including:
        an injection-molded insulating material surrounding at least portions of said initiator; and
        an insert member joined by injection molding to said insulating material and including a body member and a shoulder integral therewith said body member having an interior section with an inward length extending inwardly within said insulating material and said shoulder having an outward length extending outwardly from said insulating material, said interior section of said body member having an interior height and said body member also having an intermediate section disposed between said interior section and said shoulder, said intermediate section having an exterior portion with an exterior height disposed outwardly of said insulating material and in which said exterior height of said exterior portion of said intermediate section is greater than said interior height of said interior section.

4. An initiator assembly for use in a vehicle, comprising:
    an initiator including an initiator charge and at least one conductive pin having a length used in igniting said initiator charge; and
    a collar assembly joined to said initiator and including:
        an injection-molded insulating material surrounding at least portions of said initiator, said insulating material extending in a direction of said length of said at least one conductive pin and defining a mating interface including a cavity containing at least first portions of said at least one conductive pin; and
    a non-planar insert member with a height extending in a direction of said length of said at least one conductive pin, said insert member having inner portions, including at least first inner portions being located within said insulating material and being surrounded by said insulating material and said insert member having outer portions being located outwardly of said insulating material wherein, when a device is to be activated using said initiator charge, at least some of said outer portions contact and support the device.

5. An initiator assembly, as claimed in claim 4, wherein:
    said inner portions of said insert member include second inner portions that define a portion of said mating interface cavity.

6. An initiator assembly, as claimed in claim 4, wherein:
said insulating material surrounds at least second portions of said at least one conductive pin.

7. An initiator assembly, as claimed in claim 4, wherein: the device is an inflator.

8. An initiator assembly, as claimed in claim 4, wherein:
said insert member includes a body member and a shoulder integral therewith, said body member having an interior section with an inward length extending inwardly within said insulating material and said shoulder has an outward length extending outwardly from said insulating material, with said outward length of said shoulder being less than twice said inward length of said interior section.

9. An initiator assembly, as claimed in claim 8, wherein:
said outward length of said shoulder is less than said inward length of said interior section.

* * * * *